(12) United States Patent
Hui et al.

(10) Patent No.: US 8,948,229 B2
(45) Date of Patent: Feb. 3, 2015

(54) DYNAMIC HOPPING SEQUENCE COMPUTATION IN CHANNEL HOPPING COMMUNICATION NETWORKS

(75) Inventors: Jonathan W. Hui, Foster City, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 13/272,932

(22) Filed: Oct. 13, 2011

(65) Prior Publication Data

US 2013/0094537 A1    Apr. 18, 2013

(51) Int. Cl.
*H04B 1/713*    (2011.01)
*H04B 1/7143*    (2011.01)

(52) U.S. Cl.
CPC .................................. *H04B 1/7143* (2013.01)
USPC .......................................................... 375/134

(58) Field of Classification Search
USPC .......................................................... 370/329
See application file for complete search history.

(56) References Cited

U.S. PATENT DOCUMENTS

| | | | |
|---|---|---|---|
| 5,937,002 A * | 8/1999 | Andersson et al. | 375/131 |
| 6,570,913 B1 | 5/2003 | Chen | |
| 2007/0070996 A1 | 3/2007 | Oran | |
| 2008/0291890 A1 * | 11/2008 | Yuasa | 370/348 |
| 2009/0040021 A1 * | 2/2009 | Seo et al. | 340/10.1 |
| 2009/0249457 A1 * | 10/2009 | Graff et al. | 726/6 |
| 2010/0091818 A1 * | 4/2010 | Sen et al. | 375/136 |
| 2010/0202282 A1 * | 8/2010 | Kang et al. | 370/203 |
| 2012/0155511 A1 | 6/2012 | Shaffer et al. | |
| 2013/0013806 A1 | 1/2013 | Woo et al. | |
| 2013/0022083 A1 | 1/2013 | Vasseur et al. | |

OTHER PUBLICATIONS

Winter et al., "RPL: IPv6 Routing Protocol for Low Power and Lossy Networks" <draft-ietf-roll-rpl-19> (Mar. 13, 2011 version), pp. 1-163.
"A Hash Function for Hash Table Lookup", pp. 1-14, 2006, http://burtleburtle.net/bob/hash/doobs.html.

* cited by examiner

*Primary Examiner* — Dang Ton
*Assistant Examiner* — Mewale Ambaye
(74) *Attorney, Agent, or Firm* — Parker Ibrahim & Berg LLC; James M. Behmke; Stephen D. LeBarron

(57) ABSTRACT

In one embodiment, a device in a channel hopping communication network independently maintains a slot counter, and computes a channel identification (ID) based on a function having inputs of i) a unique feature of the device, ii) a current slot of the slot counter, and iii) a set of possible channel IDs. Accordingly, the device configures its radio to receive on the computed channel ID for the respective current slot. In another embodiment, the device may determine, for a neighbor device, a current neighbor slot and unique neighbor feature, and correspondingly computes a neighbor channel ID based on the function using the unique neighbor feature, the current neighbor slot, and the set of possible channel IDs. As such, the device configures its radio to transmit on the computed neighbor channel ID for the respective current neighbor slot.

21 Claims, 8 Drawing Sheets

US 8,948,229 B2

DYNAMIC HOPPING SEQUENCE COMPUTATION IN CHANNEL HOPPING COMMUNICATION NETWORKS

TECHNICAL FIELD

The present disclosure relates generally to wireless communication, and, more particularly, to hopping sequence computation in hopping communication networks.

BACKGROUND

In a frequency hopping (or channel hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time. Channel schedules may be assigned to each transmitter-receiver pair independently so that neighboring transmitter-receiver pairs can communicate simultaneously on different channels. Alternatively, all devices in a network may synchronize with a single channel schedule such that all devices transmit and receive on the same channel at any time.

Ideally, independent but simultaneous transmitters would be configured to transmit on different channels. By utilizing different channels simultaneously, transmitters in close proximity avoid collisions, maximize channel capacity, and maximize the likelihood that the intended receiver(s) will properly receive the packet(s). To comply with United States FCC rules, the channel-hopping sequence must be a pseudo-random sequence and must not be coordinated across multiple devices. The former requirement implies that the sequence cannot be a simple, short repeated sequence (e.g. 1, 2, 3, . . . , N, 1, 2, 3, . . . , N). The latter requirement implies that devices cannot negotiate channel sequences that ensure no overlaps.

Adding to the challenge, low-power and lossy networks (LLNs) are typically composed of resource-constrained devices (e.g., limited memory, computation, energy, communication, etc.). Nodes within LLNs typically communicate over physical links that may have variable quality that could be affected by environmental conditions that change over time. Furthermore, LLN deployments can be both large and dense, such that LLN deployments can utilize 1000 to 5000 devices in a single network, and each LLN device may communicate with 100 or more neighbors.

Generally, the channel-hopping sequence should have a large period (i.e., large number of entries), otherwise it will not be considered pseudo-random. In some environments (e.g., due to limited memory and/or large numbers of neighbors), however, maintaining separate lists of channels for each neighbor may be infeasible.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
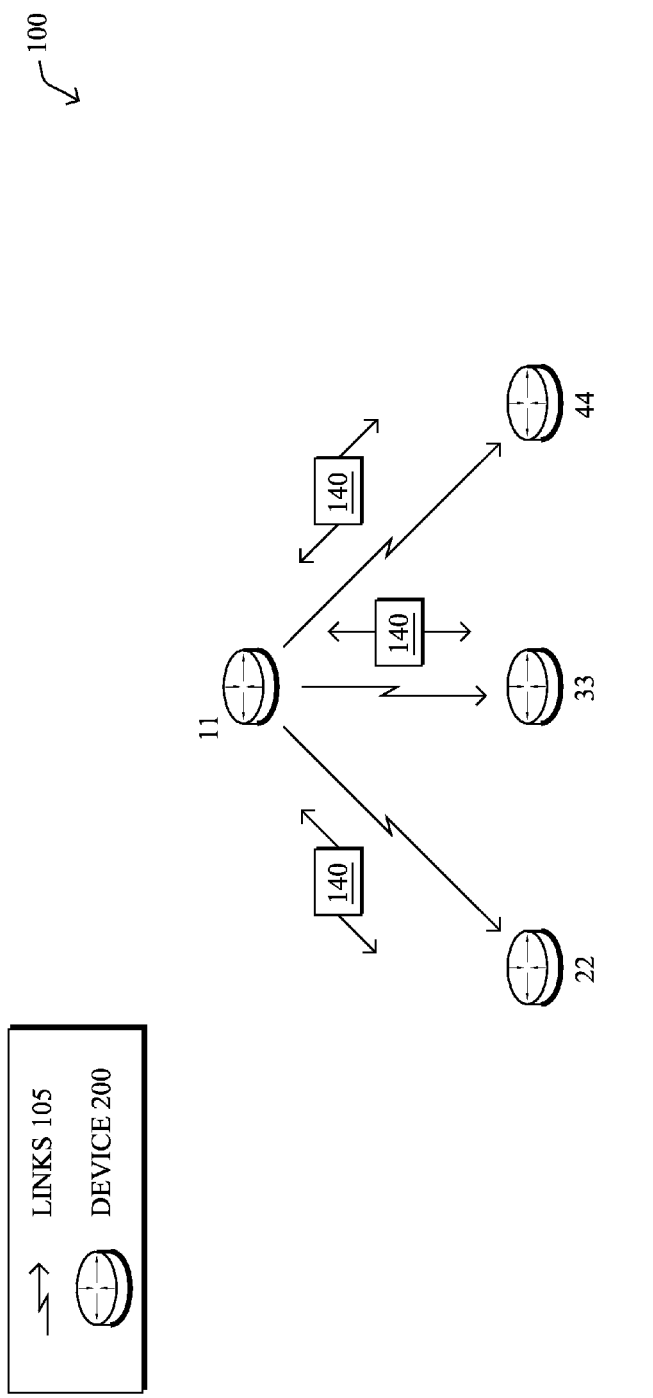
FIG. 1 illustrates an example communication network.

According to one or more embodiments of the disclosure, a device in a channel hopping communication network independently maintains a slot counter, and computes a channel identification (ID) based on a function having inputs of i) a unique feature of the device, ii) a current slot of the slot counter, and iii) a set of possible channel IDs. Accordingly, the device configures its radio to receive on the computed channel ID for the respective current slot. According to one or more additional embodiments, the device may determine, for a neighbor device, a current neighbor slot and unique neighbor feature, and correspondingly computes a neighbor channel ID based on the function using the unique neighbor feature, the current neighbor slot, and the set of possible channel IDs. As such, the device configures its radio to transmit on the computed neighbor channel ID for the respective current neighbor slot.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless or otherwise) illustratively comprising nodes/devices 200 (e.g., labeled as shown, "11," "22," "33," and "44") interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices 11-44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
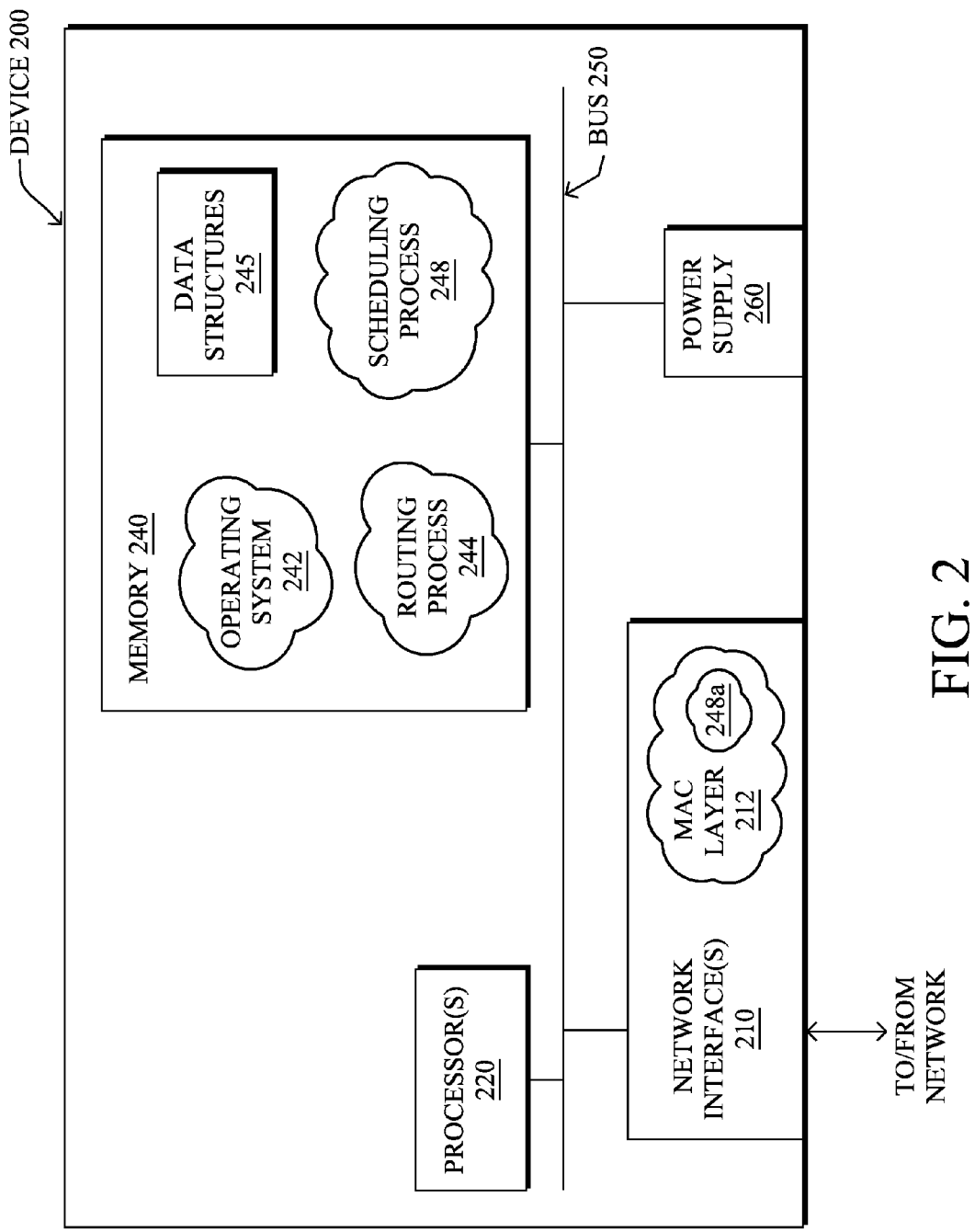
FIG. 2 illustrates an example device/node.

FIG. 2 is a schematic block diagram of an example node/device 200 that may be used with one or more embodiments described herein, e.g., as nodes 11-44. The device may comprise one or more network interfaces 210 (e.g., wireless/frequency-hopping), at least one processor 220, and a memory 240 interconnected by a system bus 250, as well as a power supply 260 (e.g., plug-in, battery, etc.).

The network interface(s) 210, e.g., transceivers or simply "radios," contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "scheduling" process 248 as described in greater detail below. Note that while scheduling process 248 is shown in centralized memory 240, alternative embodiments provide for the mode selection process to be specifically operated within the network interfaces 210, such as a component of MAC layer 212 (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
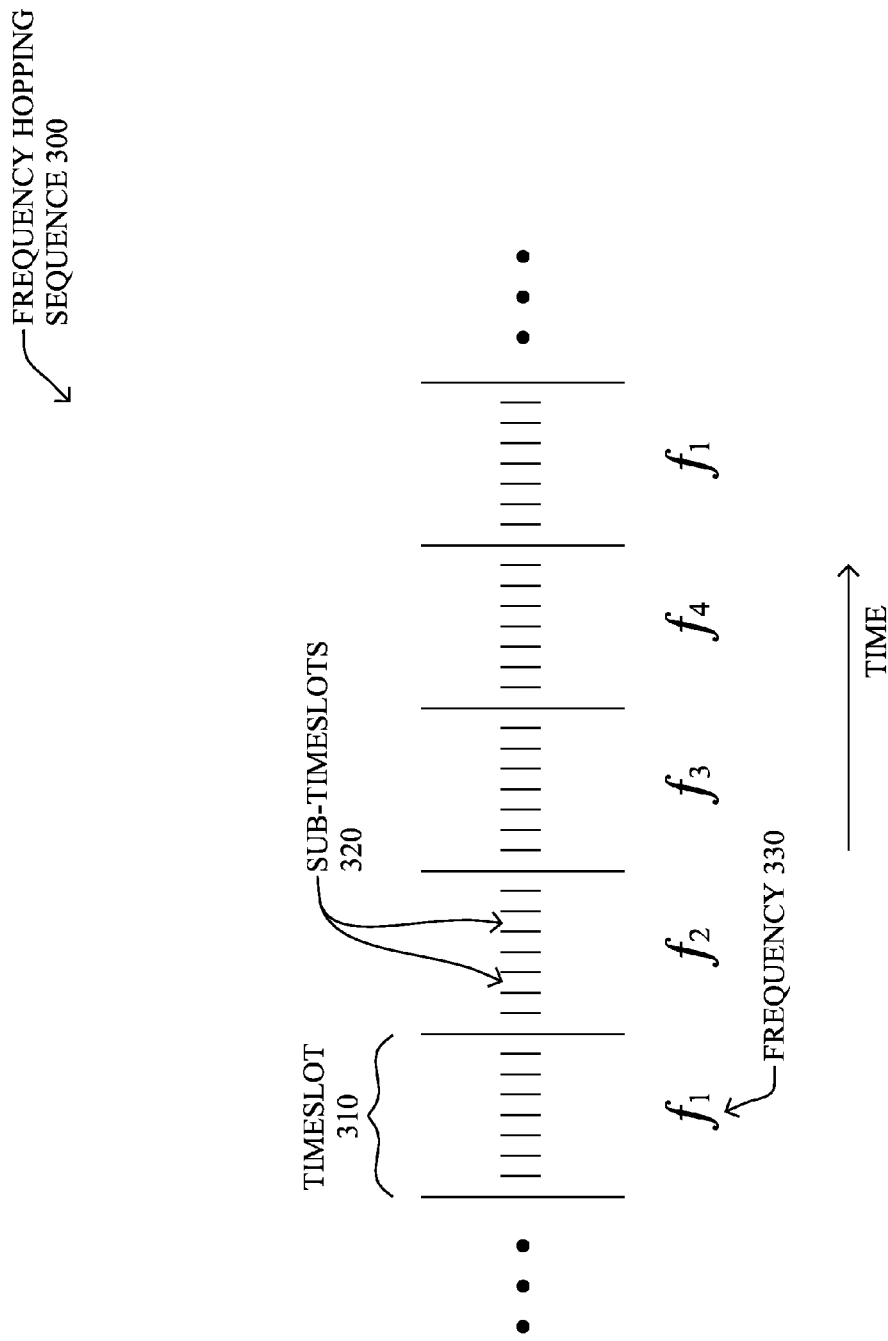
FIG. 3 illustrates an example frequency hopping sequence.

In general, as shown in FIG. 3, in frequency-hopping wireless networks, time frames are divided within a frequency-hopping sequence 300 into regular timeslots 310, each one operating on a different frequency 330 (e.g., $f_1 f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 4A:
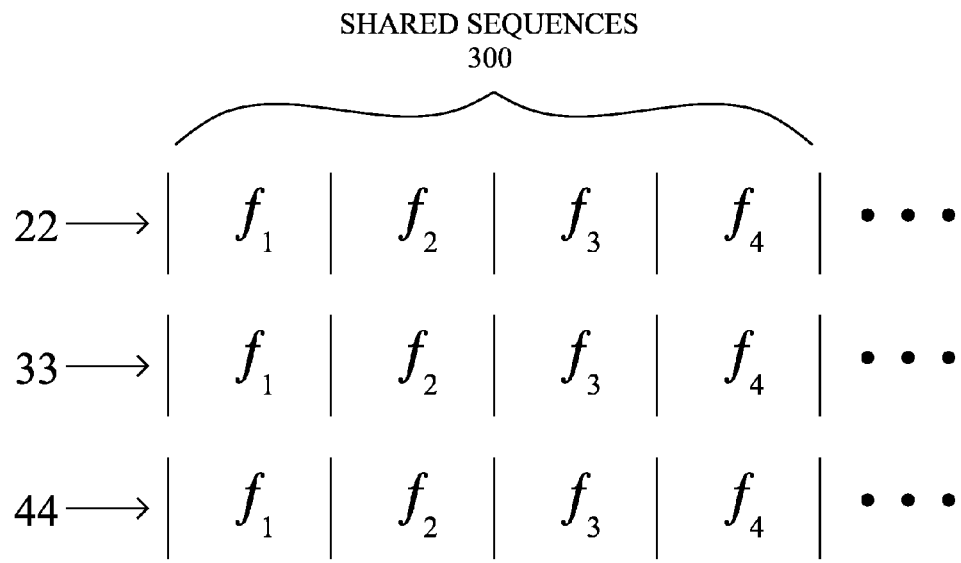
FIGS. 4A-4B illustrate another example of frequency hopping sequences.

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4A, in which each receiver (e.g., 22, 33, and 44) are all configured with the same sequence (assume also that node 11 uses the same sequence).

Figure 4B:
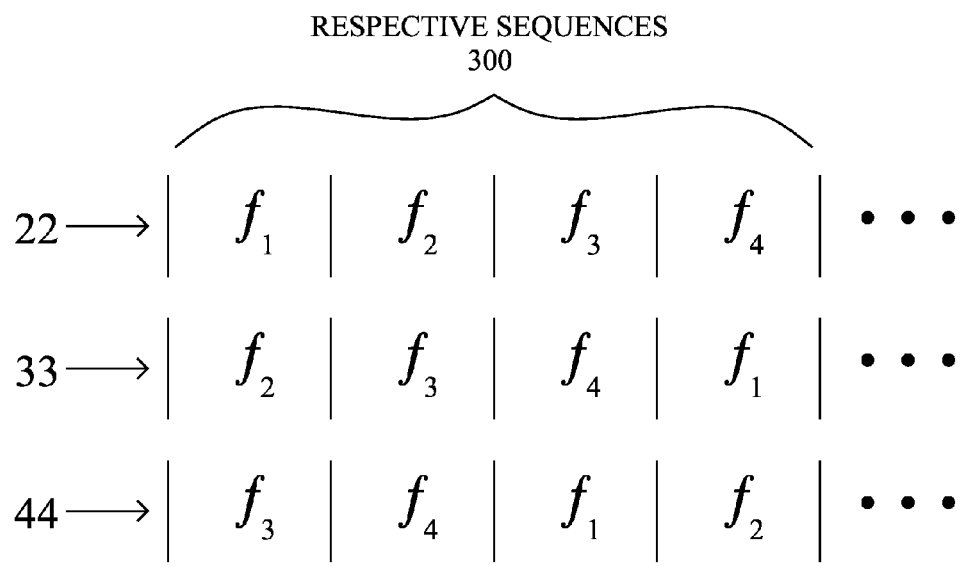

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4B. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, frequency/channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Accordingly, an illustrative enhanced example network configuration may be generally premised on the following factors:

1) Having each device determine its own unicast schedule independent of all other devices,
2) Synchronizing the network to a common broadcast schedule that also indicates when devices listen for broadcast transmissions instead of unicast transmissions,
3) Transmitting unicast messages according to the listening schedules determined by the receiver, and
4) Transmitting broadcast messages according to the broadcast schedule.

Operationally, each node maintains its own channel-hopping schedule for receiving unicast messages, thus independently determining a "local unicast listening schedule" for each device. A unicast schedule is defined by the following parameters:

1) Channel Sequence: a list of channels, e.g., indexed by a 16-bit integer, that a mesh interface follows when listening for unicast transmissions. Each entry in the Channel Sequence may be determined by a function that is based on a unique identifier of the device, e.g., the interface's MAC address, and the list index. Using the MAC address helps ensure that neighboring nodes do not follow the same pseudo-random sequence and reduces the chance of repeated collisions by neighboring transmitter-receiver pairs.

2) Slot Duration: the unicast schedule divides time into equal sized slots. A node listens to a single channel for the entire duration of a slot. At the beginning of each slot, the node switches to the next channel in the unicast schedule for listening. Note that as mentioned above, each independently determined unicast listening schedule can be independently timed, i.e., the slots (timeslots, sub-timeslots, etc.) need not align between different devices schedules.

Figure 5:
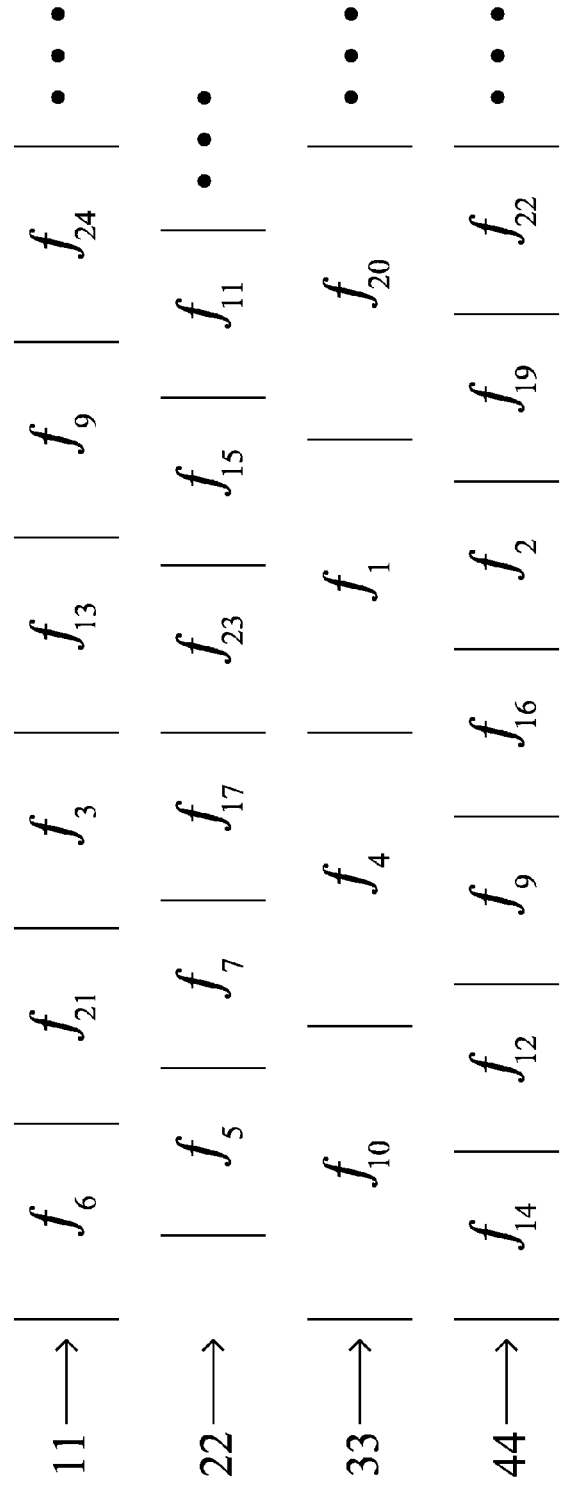
FIG. 5 illustrates example independently determined and independently timed unicast frequency hopping sequences.

FIG. 5 illustrates another example of independently determined local unicast listening schedules 300 that may be computed by each individual device in the network 100. Note how there is generally no overlap at any given time (a goal of the scheduling algorithm, but not a necessity), and that certain frequencies may be re-used at different times. Note also that contrary to FIG. 4B, the schedules are completely independent, that is, they are not simply an offset of the same order, and the slots do not generally line up between the devices.

A transmitter must learn and synchronize with a receiver's channel-hopping schedule to successfully transmit unicast messages to it. Accordingly, each device may share their local unicast listening schedule with its neighbors, such that each device can correspondingly discovering a neighbor unicast listening schedule for each neighbor, accordingly. As mentioned above, a node includes information about its unicast schedule in various link frames (packets 140) to allow neighboring nodes to synchronize to its unicast schedule. The information may generally include the phase information, i.e., the amount of time that has elapsed between a "Start-of-Frame" transmission and the start of the current unicast timeslot, and slot information, i.e., the slot number during which the Start-of-Frame was transmitted.

Having each receiver maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

As also mentioned above, independent but simultaneous transmitters are ideally configured to transmit on different channels. By utilizing different channels simultaneously, transmitters in close proximity avoid collisions, maximize channel capacity, and maximize the likelihood that the intended receiver(s) will properly receive the packet(s). To comply with United States FCC rules, the channel-hopping sequence must be a pseudo-random sequence and must not be coordinated across multiple devices. The former requirement implies that the sequence cannot be a simple, short repeated sequence (e.g. 1, 2, 3, . . . , N, 1, 2, 3, . . . , N). The latter requirement implies that devices cannot negotiate channel sequences that ensure no overlaps.

Adding to the challenge, low-power and lossy networks (LLNs) are typically composed of resource-constrained devices (e.g., limited memory, computation, energy, communication, etc.). Nodes within LLNs typically communicate over physical links that may have variable quality that could be affected by environmental conditions that change over time. Furthermore, LLN deployments can be both large and dense, such that LLN deployments can utilize 1000 to 5000 devices in a single network, and each LLN device may communicate with 100 or more neighbors.

Generally, the channel-hopping sequence should have a large period (i.e., large number of entries), otherwise it will not be considered pseudo-random. In some environments (e.g., due to limited memory and/or large numbers of neighbors), however, maintaining separate lists of channels for each neighbor may be infeasible.

Dynamic Hopping Sequence Computation

Notably, there are a number of ways to determine a channel-hopping sequence. Each method typically has a number of tradeoffs in terms of the properties of the resulting channel-hopping sequence and the resources required to compute the channel-hopping sequence. The resource-constrained nature and dynamic link characteristics of LLNs implies that devices should not need to maintain an explicit list of channels specifying a pseudo-random sequence in memory. Accordingly, the optimized techniques herein provide a technique for dynamically computing channel hopping sequences/schedules, and allow nodes and/or the network to dynamically choose between a number of methods based on the desired properties and/or available resources.

The techniques described herein, therefore, introduces the use of function to support independent and uncoordinated pseudo-random sequences with minimal overhead. The function (e.g., hash) input includes a node's unique identifier (e.g., MAC address) and running slot counter to ensure that neighboring receiver will utilize different pseudo-random sequences. This invention also introduces dynamically switching between different methods for determining a channel-hopping sequence, based on statistics obtained from the network, user requirements, and resource consumption of the particular methods.

Specifically, according to one or more embodiments as described in greater detail below, a device in a channel hopping communication network independently maintains a slot counter, and computes a channel identification (ID) based on a function having inputs of i) a unique feature of the device, ii) a current slot of the slot counter, and iii) a set of possible channel IDs. Accordingly, the device configures its radio to receive on the computed channel ID for the respective current slot. According to one or more additional embodiments, the device may determine, for a neighbor device, a current neighbor slot and unique neighbor feature, and correspondingly computes a neighbor channel ID based on the function using the unique neighbor feature, the current neighbor slot, and the set of possible channel IDs. As such, the device configures its radio to transmit on the computed neighbor channel ID for the respective current neighbor slot.

Illustratively, the techniques described herein may be performed by hardware, software, and/or firmware, such as in accordance with scheduling process 248 and/or MAC layer module 212 (248a), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols, accordingly.

Figure 6:
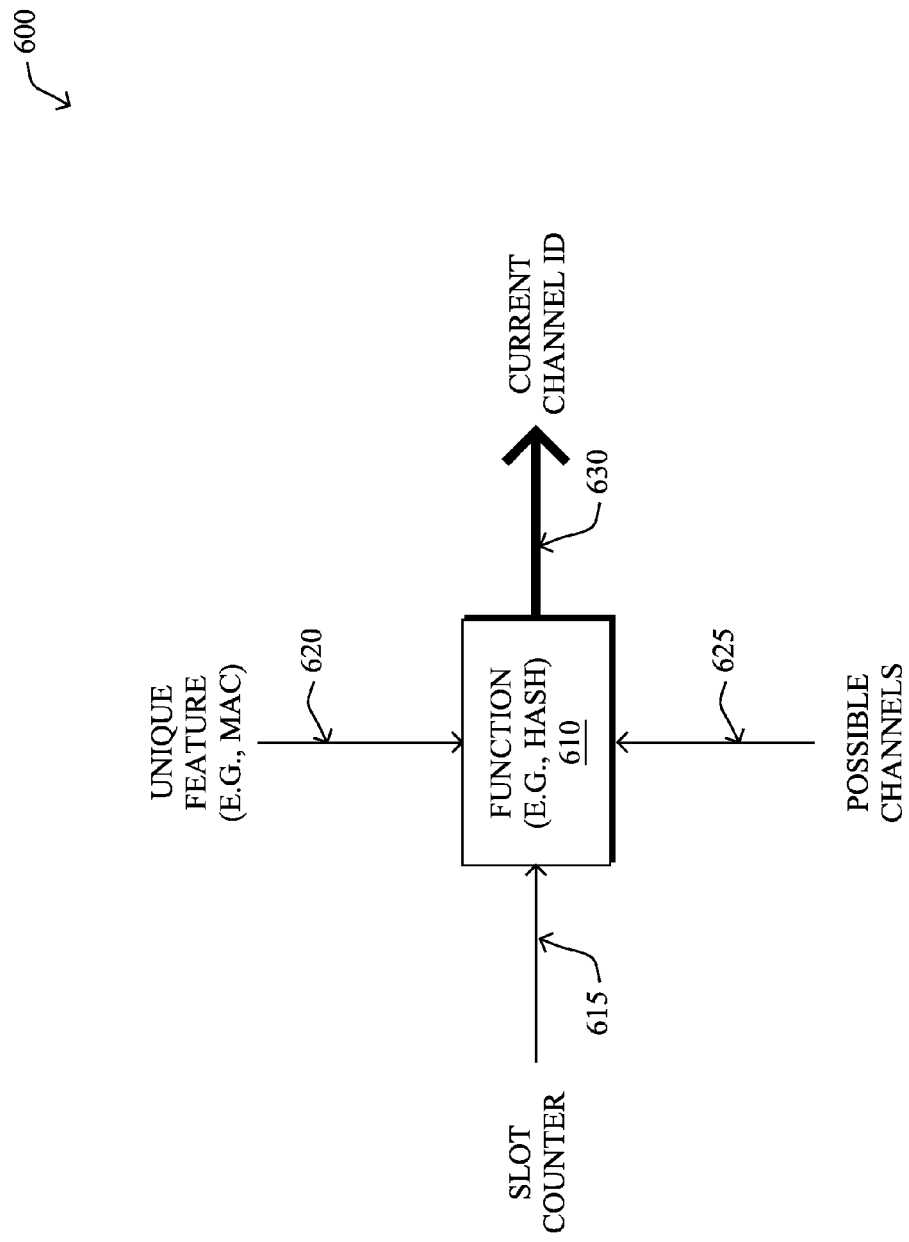
FIG. 6 illustrates an example dynamic computation of hopping schedules in a channel hopping communication network.

Operationally, the techniques herein utilize a selected function to determine a particular receiver's channel hopping sequence. As illustrated in FIG. 6, a computation 600 is based on the selected function 610, such as an example hash function. Each node independently maintains a local fixed-width counter, called the slot counter 615, and at the beginning of each slot, a node performs the following actions:

1) Increment the slot counter 615;

2) Compute the Channel Identification (ID) 630 using the function 610, which takes the slot counter 615, a unique feature of the receiver (e.g., MAC address) 620, and a set of possible Channel IDs 625 (e.g., number of channels). For instance, an example function 610 may comprise: HASH (MAC_address, slot_counter) % possible_channels.

3) Configure radio 210 to receive on the computed channel

Note that in Step 2, including the unique feature (e.g., MAC address) of the device ensures that the particular output sequence will be different than those of other devices.

Also note that the Channel ID 630 computed in Step 2 may or may not map to the exact channel identifier used by the radio. In some cases, channels are identified using different integer offsets (e.g., "11" through "26" in IEEE 802.15.4-2006). In other cases, some channels may be disabled due to interference mitigation. For example, while a Channel ID of "1" and "2" may map to physical channels "1" and "2," respectively, a Channel ID of "3" may map to physical channel "4." In this case, for example, physical channel "3" may have been disabled to avoid interference with other systems in close proximity.

According to the techniques herein, when a device wishes to synchronize with a neighboring node's receiver schedule, e.g., node 11 synchronizing with node 22, it simply needs to obtain the receiver's current slot time, MAC address, and current slot counter. With those three items of information, a device transmits to the receiver by computing the receiver's channel as described above in algorithm 600, and transmitting on that channel. Specifically, the device (e.g., node 11) determines for its neighbor device (node 22), a current neighbor slot and unique neighbor feature, and through function 610, computes a neighbor channel ID 630 based on the function using the unique neighbor feature 620, the current neighbor slot 615, and the set of possible channel IDs 625. Accordingly, the device configures its radio to transmit on the computed neighbor channel ID for the respective current neighbor slot. Note that the current slot time for the neighbor device is used when transmitting the desired message 140 to the neighbor device.

There are a number of advantages to using a function 610 to compute the channel sequences. For example, the pseudo-random sequence does not need to be maintained in memory, and instead, devices can compute a particular entry on-demand. Also, the functions as defined herein have constant-time computation complexity, meaning that a device can start following a sequence at any point within the sequence. (Note that some existing systems require a device to iteratively compute all N−1 entries to obtain the N-th channel.) Moreover, a good function will generate a pseudo-random output with a uniform distribution.

It should be noted that the specific use of a hash function as function 610 to compute a channel hopping sequence is merely one example computational technique that can be used. There are a wide range of well-known hash functions, some of which require very little computation, but do not produce particularly good pseudo-random sequence. For example, a simple additive hash function only requires N adds, where N is the size of the hash input, but does not produce a good pseudo-random sequence. At the other end of the spectrum, cryptographic hash functions are very good at producing pseudo-random sequences, but require much more significant computation. Note that cryptographic hash functions may be used with a secret key to produce a pseudo-random sequence that is known only to those nodes that know the secret key. Having such a sequence is useful as it can increase the difficulty of attacking a channel-hopping network.

The techniques herein thus provide for dynamically selecting between different methods for determining a channel hopping sequence. For instance, various methods may have different requirements in terms of computation and memory requirements. However, methods that require less computation and memory typically result in channel hopping sequences with fewer desirable properties. In one embodiment, the different functions 610 may comprise different hash functions (e.g., a non-cryptographic hash function vs. a cryptographic hash function). In another embodiment, the different functions may comprise non-hash-based functions (e.g., a function that operates over a finite field, for example Galois, or even maintaining a simple list of channels in memory).

To assist in selecting an appropriate channel sequence computation function 610, devices in the network may compute and maintain live statistics, i.e., one or more network characteristics. Such characteristics may illustratively comprise computation requirements, an amount of traffic in the network, an amount of memory utilization and/or availability, and the channel hopping sequence quality.

Regarding computation, nodes may maintain information about how much computation is spent computing a channel-hopping sequence. Functions that require more computation will generally increase the computation statistic. However, the statistic is also dependent on the amount of traffic the device is sending and higher amounts of traffic leads to higher computation requirements. As a result, when a device has limited computation capabilities but is sending a lot of traffic, it may choose to use a method that has less computation requirements.

Also, additional functions may require different amounts of memory for each neighbor (e.g., maintaining a simple list consumes more memory, but requires less computation). Accordingly, the number of neighbors that a device must communicate with can help determine what functions are appropriate with regard to memory, and is simpler than monitoring memory utilization, particularly of neighbor devices.

Lastly, with regards to the quality of the channel hopping sequence, in a very sparse network, having all devices follow the same sequence (but at different offsets) may be completely acceptable since the probability of collisions between different transmitters will be low. However, in a dense network, the probability of collisions will typically be higher. In general, hash functions that require very little computation tend to produce outputs that are not as random and can lead to additional collisions. Devices can thus maintain information on the number of collisions they see (e.g., by counting the number of failures or failed acknowledgments) and may use that information to assist in selecting a proper function 610.

Note that in addition to collected statistics, the network characteristics may comprise a manual command. That is, the system may take input from a user on specific requirements, such as upper bounds on the amount of memory or computation that a function may use, effectively eliminating the use of high memory or computation techniques in a deployment. Alternatively, a user may require the use of cryptographic methods and limits use to only cryptographic hashes.

In one embodiment, each device may locally choose (determine) their preferred function, and advertises the function to its neighboring devices in order to allow the neighbors to communicate with the device's receivers. In doing so, a device (e.g., node 11) may take statistics input from neighboring devices and determines the best method for computing the receiving schedule at node 11. For example, if neighboring devices have limited memory or constrained on computation, node 11 may choose to use a method that requires fewer resources.

Alternatively, in another embodiment based on centralized global determination, each device may periodically report their statistics to a central coordinator (e.g., a border router or network management server, "NMS"). The central coordinator may then use the statistics to determine the best method for a particular device or the network as a whole. Note that the use of the centralized approach provides for selection of the particular function 610, and generally not the actual execution of the function, where the synchronization between receivers and neighboring devices still occurs in a localized manner as described above.

In accordance with one or more aspects of the techniques herein, a receiver may notify its neighbors of its channel hopping schedule in a number of ways. One proactive method is by using unsynchronized transmissions, which implements a broadcast mechanism within a channel hopping system. One reactive method is by piggybacking information about the change in packets 140 (data or acknowledgments) sent to neighboring devices. In this reactive method, the device can indicate the new channel hopping schedule algorithm along with a time that it plans to switch. (While the reactive method will only notify those neighbors that are actively communicating with the device, it is generally less costly than an unsynchronized transmission.) Other techniques to distribute the selected function 610 (and any associated input information) may be utilized according to the embodiments herein, and those mentioned herein are merely optional examples.

Figure 7:
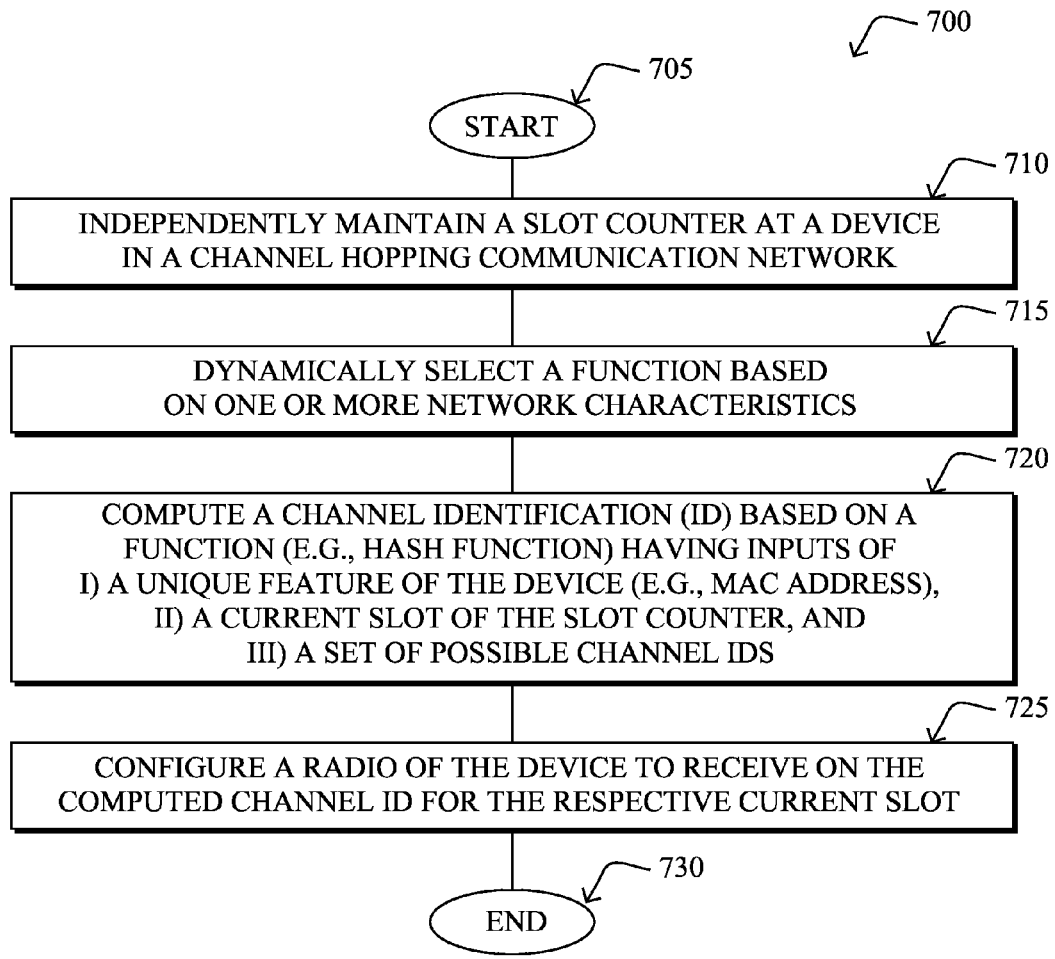
FIG. 7 illustrates an example simplified procedure for dynamically computing hopping schedules in a channel hopping communication network, e.g., from the perspective of receiving transmissions.

FIG. 7 illustrates an example simplified procedure for dynamically computing hopping schedules in a channel hopping communication network in accordance with one or more embodiments described herein, e.g., from the perspective of receiving transmissions. The procedure 700 starts in step 705, and continues to step 710, where, as described in greater detail above, a device 200 independently maintains a slot counter 615, and in step 715 may optionally dynamically select a particular function 610 based on one or more network characteristics. In step 720, the device may compute a channel ID 630 based on the function (e.g., hash function) 610 having inputs of i) a unique feature of the device (e.g., MAC address) 620, ii) a current slot of the slot counter 615, and iii) a set of possible channel IDs 625. Once the current channel ID 630 is computed, the device may correspondingly configure its radio (interface 210) in step 725 to receive on the computed channel ID for the respective current slot. The procedure illustratively ends in step 730, though additional channel IDs, e.g., for future slots, may be computed as well, as opposed to merely on-demand receiver configuration.

Figure 8:
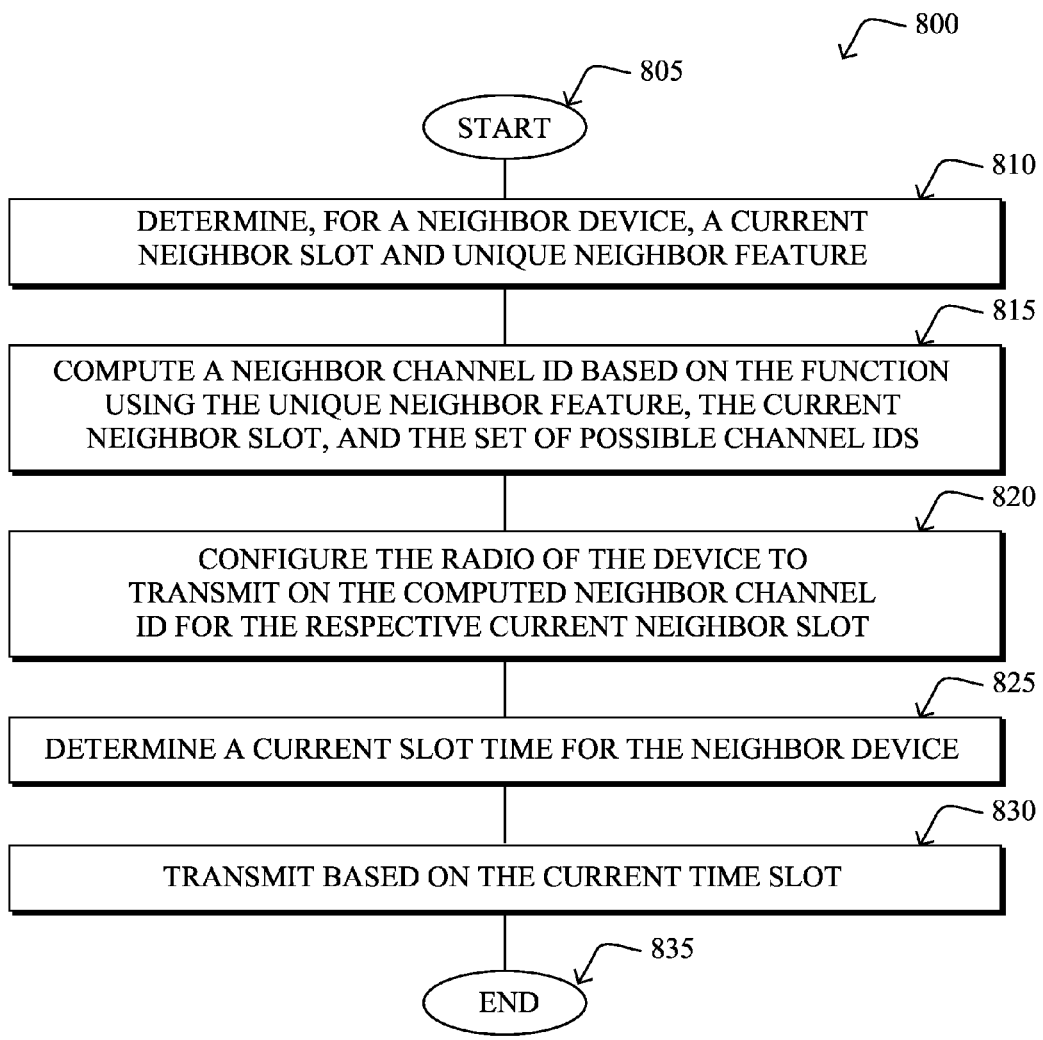
FIG. 8 illustrates an example simplified procedure for dynamically computing hopping schedules in a channel hopping communication network, e.g., from the perspective of transmitting to a neighbor.

In addition, FIG. 8 illustrates an example simplified procedure for dynamically computing hopping schedules in a channel hopping communication network in accordance with one or more embodiments described herein, e.g., from the perspective of transmitting to a neighbor. The procedure 800 starts in step 805, and continues to step 810, where, as described in greater detail above, the device determines, for a neighbor device, a current neighbor slot and unique neighbor feature. Based on this information, the device computes a neighbor channel ID in step 815 based on the function 610 using the unique neighbor feature 620, the current neighbor slot 615, and the set of possible channel IDs 625. The resultant channel ID 630 may then be used in step 820 to configure the radio of the device for transmission to the neighbor for the respective current neighbor slot. In particular, for the transmission, in step 825 the device determines a current slot time for the neighbor device, and then in step 830 may transmit the message 140, accordingly. The procedure 800 illustratively ends in step 835.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The novel techniques described herein dynamically compute hopping schedules in a channel hopping communication network. In particular, a system according to one or more embodiments herein allows independent channel-hopping sequences for each receiver in a network in order to maximize channel use, and provides a constant-time technique for computing a particular element in the sequence, as noted above. In addition, the techniques herein minimize memory overhead by only maintaining the unique feature (e.g., MAC address), beginning time of the current slot, and slot counter. Moreover, the techniques herein simplify deployment because devices and/or the network autonomously determine the best approach to computing a channel-hopping sequence.

While there have been shown and described illustrative embodiments that dynamically compute hopping schedules in a channel hopping communication network, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols using frequency hopping, such as certain PLC protocols. Also, while the description above relates to packets, the techniques may be equally applicable to non-packetized transmissions. Moreover, while the above description references LLNs and AMI networks, these are merely example types of networks that may benefit from one or more techniques described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for dynamically computing a channel hopping sequence in a channel hopping communication network, comprising:
   providing the channel hopping communication network including a plurality of devices that serve as receivers, each device configured to compute the channel hopping sequence;
   independently maintaining a slot counter at each device of the plurality of devices in the channel hopping communication network;
   computing, by each device of the plurality of devices, a channel identification (ID) based on a function having inputs of i) a unique feature of the device, ii) a current slot of the slot counter, and iii) a set of possible channel IDs, so as to compute the channel hopping sequence; and
   configuring, by each device of the plurality of devices, a radio of the device to receive on the computed channel ID for the respective current slot.

2. The method as in claim 1, wherein the unique feature is a media access control (MAC) address of the device.

3. The method as in claim 1, wherein the function is a hash function.

4. The method as in claim 3, wherein the hash function is a cryptographic hash function.

5. The method as in claim 1, further comprising:
   determining, for a neighbor device, a current neighbor slot and unique neighbor feature;
   computing a neighbor channel ID based on the function using the unique neighbor feature, the current neighbor slot, and the set of possible channel IDs; and
   configuring the radio of the device to transmit on the computed neighbor channel ID for the respective current neighbor slot.

6. The method as in claim 1, further comprising:
   dynamically selecting the function based on one or more network characteristics.

7. The method as in claim 6, wherein the network characteristics are selected from a group consisting of: an amount of computation for the channel ID; an amount of traffic; an amount of memory; and a channel hopping sequence quality.

8. The method as in claim 6, wherein the network characteristics comprise a manual command.

9. The method as in claim 6, wherein selecting is based on at least one of either local determination or centralized global determination.

10. A method for dynamically computing a channel hopping sequence in a channel hopping communication network, comprising:
    providing the channel hopping communication work including a plurality of devices that serve as receivers, each device configured to compute the channel hopping sequence;
    determining, by each device of the plurality of devices in the channel hopping communication network, a current neighbor slot of a slot counter and unique neighbor feature for a particular neighbor device;
    computing, by each device of the plurality of devices, a neighbor channel identification (ID) based on a function having inputs of i) the unique neighbor feature, ii) the current neighbor slot, and iii) a set of possible channel IDs, so as to compute the channel hopping sequence; and
    configuring, by each device of the plurality of devices, a radio of the device to transmit on the computed neighbor channel ID for the respective current neighbor slot.

11. The method as in claim 10, wherein the unique neighbor feature is a media access control (MAC) address of the neighbor device.

12. The method as in claim 10, wherein the function is a hash function.

13. The method as in claim 10, further comprising:
    determining a current slot time for the neighbor device; and
    transmitting based on the current slot time.

14. An apparatus for dynamically computing a channel hopping sequence in a channel hopping communication network, comprising:
    a processor adapted to execute one or more processes;
    a plurality of transceivers provided in the channel hopping communication network, each transceiver configured to compute the channel hopping sequence;
    each transceiver of the plurality of transceivers configured to communicate in the channel hopping communication network; and
    a memory configured to store a process executable by the processor, the process when executed operable to:
      independently maintain a slot counter at each transceiver of the plurality of transceivers;
      compute, by each transceiver of the plurality of transceivers, a channel identification (ID) based on a function having inputs of i) a unique feature of the apparatus, ii) a current slot of the slot counter, and iii) a set of possible channel IDs, so as to compute the channel hopping sequence; and
      configure, by each transceiver of the plurality of transceivers, the transceiver to receive on the computed channel ID for the respective current slot.

15. The apparatus as in claim 14, wherein the unique feature is a media access control (MAC) address of the apparatus.

16. The apparatus as in claim 14, wherein the function is a hash function.

17. The apparatus as in claim 14, wherein the process when executed is further operable to:
    determine, for a neighbor device, a current neighbor slot and unique neighbor feature;
    compute a neighbor channel ID based on the function using the unique neighbor feature, the current neighbor slot, and the set of possible channel IDs; and
    configure the transceiver to transmit on the computed neighbor channel ID for the respective current neighbor slot.

18. The apparatus as in claim 14, wherein the process when executed is further operable to:
    dynamically select the function based on one or more network characteristics.

19. A tangible, non-transitory, computer-readable medium having software encoded thereon that is configured to dynamically compute a channel hopping sequence in a channel hopping communication network, the software when executed by a processor operable to:
    provide the channel hopping communication network including a plurality of devices that serve as receivers, each device configured to compute the channel hopping sequence;
    independently maintain a slot counter at each device of the plurality of devices in the channel hopping communication network;
    compute, by each device of the plurality of devices, a channel identification (ID) based on a function having inputs of i) a unique feature of the device, ii) a current slot of the slot counter, and iii) a set of possible channel IDs, so as to compute the channel hopping sequence; and configure, by each device of the plurality of devices, a radio of the device to receive on the computed channel ID for the respective current slot.

20. The tangible, non-transitory computer-readable medium as in claim 19, wherein the unique feature is a media access control (MAC) address of the device, and wherein the function is a hash function.

21. The tangible, non-transitory computer-readable medium as in claim 19, wherein the software when executed is further operable to:
  determine, for a neighbor device, a current neighbor slot and unique neighbor feature;
  compute a neighbor channel ID based on the function using the unique neighbor feature, the current neighbor slot, and the set of possible channel IDs; and
  configure the radio of the device to transmit on the computed neighbor channel ID for the respective current neighbor slot.

\* \* \* \* \*